L. A. HEARD.
Gage for Indicating the Amount of Water in Oil Cars.
No. 200,138. Patented Feb. 12, 1878.
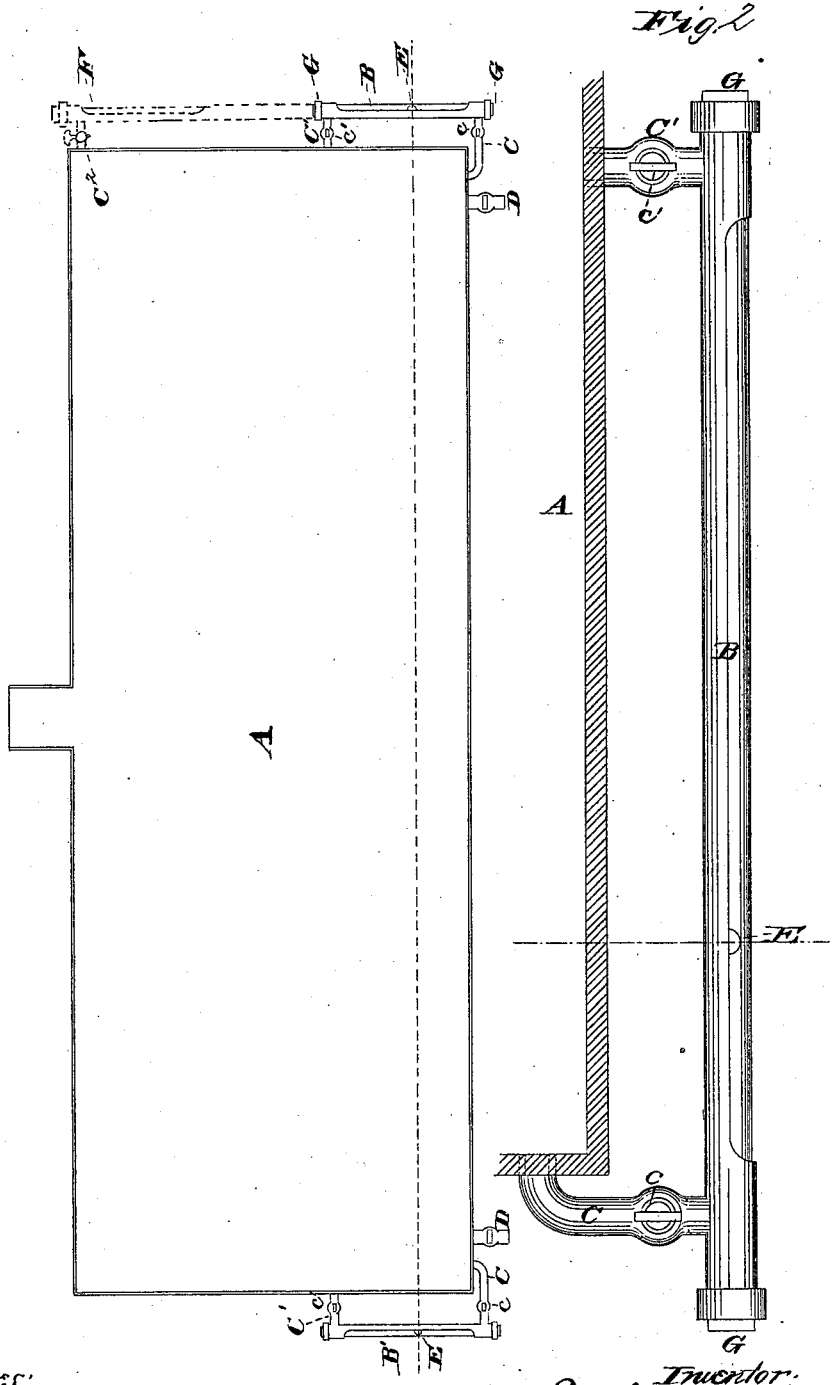

UNITED STATES PATENT OFFICE.

L. ALLEN HEARD, OF CLEVELAND, OHIO.

IMPROVEMENT IN GAGES FOR INDICATING THE AMOUNT OF WATER IN OIL-CARS.

Specification forming part of Letters Patent No. 200,138, dated February 12, 1878; application filed July 25, 1877.

*To all whom it may concern:*

Be it known that I, L. ALLEN HEARD, of Cleveland, in the county of Cuyahoga and State of Ohio, have invented certain new and useful Improvements in Apparatus for Transporting or Storing Oil and other liquids; and I do hereby declare the following to be a full, clear, and exact description of the invention, such as will enable others skilled in the art to which it pertains to make and use it, reference being had to the accompanying drawings, which form part of this specification.

My invention relates to an improvement in apparatus for transporting or storing oil and similar liquids, and more particularly described as applied to oil and the cars or tank-cars for transporting oils.

My invention consists in a gage or indicator, attached to the car or tank at its bottom, and extending partly or entirely up its side or end, for indicating the amount of water that there may be in the tank or car.

The apparatus in operation consists of a glass indicator, connected with the car at the bottom and at a point intermediate between the bottom and top of the tank or car, so that an equilibrium or common level of oil and water may be established both within the tank and within the glass tube or indicator, thus indicating the level of water within the tank.

In the drawing, Figure 1 is a longitudinal central section of an oil car or tank embodying my invention, and showing one of my gages at each end of the car. Fig. 2 represents a separate view of one of my indicators.

It is well known that in the shipment of oil in oil-tanks, or "tank-cars," as they are frequently termed, it is frequently—in fact, generally—the case that the tank becomes partially filled with water, owing to the water that passes in with the oil. This water finds its level in the bottom of the car, beneath the oil. It is apparent, however, that the car does not carry the amount of oil that is indicated by its level in the tank. Moreover, in shipping a tank-car of oil, freight is charged for the whole bulk or weight. A portion of this bulk being water, there is a loss in freight and a necessary shortage in oil.

The object of my invention is to indicate at all times the level of water in the tank, so that at any time, and particularly before the oil is shipped, the water may be drawn off by means of any suitable cock, until the indicator shows that nothing but oil is left in the tank.

I will now proceed to describe my invention.

A is a tank or oil-car of the ordinary or any pattern. B B' are tubes or indicators. They are made, preferably, of metal, with a glass face, through which the level of water be seen. C C$^1$ are connections with the tank, governed by suitable stop-cocks $c$ $c'$. D are suitable cocks for drawing off the water.

Now, it is apparent that in filling the car water that may be in the bottom of the car, or that may pass in with the oil, will rest beneath the oil and will rise in the indicator. As the oil is fed in from above, this water will rise in the indicator to a level due to the weight of the superincumbent oil within the car, and the water-level will not be correctly indicated in the indicators B B until the oil shall have risen to a level above the connections C$^1$. As soon as the oil rises above these points it will pass into the indicators, and the indicators will immediately show the true level, and equilibrium between the oil and water will be established both within the tank and within the indicators, and the indicators will then immediately show the same level of water that exists within the tank.

If desired, the indicators may be extended to the top of the car, as shown in dotted lines in Fig. 1, in which event the indicator would show at the same time the level of oil within the tank.

When the tank has been filled the stop-cock D, which is at the end of the car resting at the lowest level, may be opened, and the water be drawn off until the indicators show there is no more water left in the tank. The stop-cock is then closed, and it is then known that the tank contains nothing but oil.

I prefer, generally, to place the indicator at each end of the car—one at B and the other at B'—because it is rarely the case that the car will stand upon a level. Therefore the water will stand at a different level in the opposite ends of the tank, as shown by the indicators, and in that event it would be necessary to draw off the water from that end of the car which indicated the highest level of water, as that would be the lowest end of the car.

In case the indicator should become broken I provide stop-cocks $c\ c'$, so that by turning them the oil may be prevented from escaping through the break. I also prefer, generally, to employ a bulb or float within the indicator, so as the more quickly and clearly to indicate the level of water. This float is of such gravity as to float upon the water without rising through the oil. These bulbs or floats are shown at E.

If the indicator is continued to the top of the car, there should be another connection, $C^2$, for establishing an equilibrium between the top of the tube and the inside of the car or tank, and a glass face should likewise be provided along the upper portion of the tube at F.

As there is always a greater or less amount of sediment in oil that is being transported, these sediments will soon soil or fill the interior of the indicators B B'. I therefore provide caps or removable stoppers G above and below. By removing these stoppers a swab or cleaner may be inserted and the indicator cleaned.

I do not limit myself to the particular construction here shown; but many constructions may be employed without departing from the principle of my invention, which contemplates such an indicator as shall have a connection, $C^1$, intermediate between the top and bottom of the tank, whereby an equilibrium may be created between the interior of the tank and the interior of the indicator as soon as the oil shall rise above the said intermediate connection.

It is apparent that by the employment of my invention a great saving may be effected by the facility afforded for indicating the amount of water that is present at any time, thus enabling the shipper to draw off the water before shipment.

Where transparent or limpid oils are being transported, such as in color are so nearly the color of water as to be not readily distinguished therefrom, it is quite difficult to ascertain readily the level between the oil and the water; and especially is this the case when the glass tube is somewhat soiled within or without. For this reason the bulb or float before mention is employed the more readily to catch the eye. I am aware that such float has been employed to indicate at a glance the height of a liquid in a tube; but in all cases it has been of such a character and used in such a place as to float at the top of the contained liquid. In this case, however, the tube is always completely filled with liquid, and the liquid oil is apt to be of the same color and appearance in the tube as the water. The float, therefore, in my apparatus is made of such specific gravity as to float upon the water, but not light enough to rise through the oil, so that it shall rest in the liquid at the point of juncture of the two liquids—viz., at the level of water and oil; and I am not aware that a float has been thus employed of such a character as to rest in a column of liquids, and indicate by its position the point at which one liquid ends and another liquid begins.

What I claim is—

1. An indicator for oil car or tanks, the same made as a single metallic cylinder having a glass face, and provided with the stoppers or plugs at both extremities, substantially as described.

2. In an indicator for oil car or tanks, the bulb or float E, adapted by its gravity relative to both water and oil to float at the point of junction of the same within the said indicator, substantially as described.

3. The combination, with a tank-car, of an indicator, B F, and connections $C\ C^1\ C^2$, for simultaneously indicating the level of water and the height of oil in the car, substantially as and for the purposes described.

In testimony whereof I have signed my name to this specification in the presence of two subscribing witnesses.

L. ALLEN HEARD.

Witnesses:
F. TOUMEY,
W. E. DONNELLY.